(12) United States Patent
Turgeman et al.

(10) Patent No.: US 9,483,292 B2
(45) Date of Patent: Nov. 1, 2016

(54) METHOD, DEVICE, AND SYSTEM OF DIFFERENTIATING BETWEEN VIRTUAL MACHINE AND NON-VIRTUALIZED DEVICE

(71) Applicant: BioCatch Ltd., Tel Aviv (IL)

(72) Inventors: Avi Turgeman, Cambridge, MA (US); Yaron Lehmann, Tel Aviv (IL)

(73) Assignee: BioCatch Ltd., Tel Aviv (IL)

( * ) Notice: Subject to any disclaimer, the term of this patent is extended or adjusted under 35 U.S.C. 154(b) by 0 days.

(21) Appl. No.: 14/675,763

(22) Filed: Apr. 1, 2015

(65) Prior Publication Data
US 2015/0212843 A1    Jul. 30, 2015

Related U.S. Application Data

(63) Continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a (Continued)

(51) Int. Cl.
*H04L 29/08* (2006.01)
*G06F 9/455* (2006.01)
(Continued)

(52) U.S. Cl.
CPC .......... *G06F 9/45533* (2013.01); *G06F 3/041* (2013.01); *G06F 11/301* (2013.01); *G06F 11/3055* (2013.01); *G06F 21/31* (2013.01); *G06F 21/316* (2013.01); *G06F 21/32* (2013.01);
(Continued)

(58) Field of Classification Search
CPC .......... G06F 9/45533; G06F 11/3055; G06F 11/301; G06F 2221/2133; G06F 21/31; G06F 21/32; G06F 21/554; G06F 21/316; G06F 3/041; H04L 63/08; H04L 63/1408
USPC .......................................................... 726/7
See application file for complete search history.

(56) References Cited

U.S. PATENT DOCUMENTS 3,618,019 A * 11/1971 Nemirovsky ........ G07C 9/0015
                                                    178/20.01
4,128,829 A * 12/1978 Herbst ................ G06K 9/00154
                                                      382/120

(Continued)

OTHER PUBLICATIONS

Ahmed et al., "A New Biometric Technology Based on Mouse Dynamics", Jul.-Sep. 2007, IEEE Transaction on Dependable and Secure Computing, vol. 4, No. 3, pp. 165-179.*

(Continued)

*Primary Examiner* — Nabil El Hady
(74) *Attorney, Agent, or Firm* — Eitan, Mehulal & Sadot

(57) ABSTRACT

Devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized server (a banking website, an electronic commerce website, or the like). The interactions are monitored, tracked and logged. Communication interferences are intentionally introduced to the communication session; and the server tracks the response or the reaction of the end-user device to such communication interferences. The system determines whether the user is a legitimate human user; or a cyber-attacker posing as a legitimate human user but actually utilizing a Virtual Machine.

21 Claims, 6 Drawing Sheets

Related U.S. Application Data continuation-in-part of application No. 13/877,676, filed as application No. PCT/IL2011/000907 on Nov. 29, 2011, now Pat. No. 9,069,942, application No. 14/675,763, which is a continuation-in-part of application No. 14/320,653, filed on Jul. 1, 2014, and a continuation-in-part of application No. 14/320,656, filed on Jul. 1, 2014, and a continuation-in-part of application No. 14/325,393, filed on Jul. 8, 2014, and a continuation-in-part of application No. 14/325,394, filed on Jul. 8, 2014, and a continuation-in-part of application No. 14/325,395, filed on Jul. 8, 2014, and a continuation-in-part of application No. 14/325,396, filed on Jul. 8, 2014, and a continuation-in-part of application No. 14/325,397, filed on Jul. 8, 2014, and a continuation-in-part of application No. 14/325,398, filed on Jul. 8, 2014.

(60) Provisional application No. 61/973,855, filed on Apr. 2, 2014, provisional application No. 61/417,479, filed on Nov. 29, 2010, provisional application No. 61/843,915, filed on Jul. 9, 2013.

(51) Int. Cl.
| | |
|---|---|
| G06F 11/30 | (2006.01) |
| G06F 3/041 | (2006.01) |
| G06F 21/31 | (2013.01) |
| G06F 21/32 | (2013.01) |
| G06F 21/55 | (2013.01) |
| H04L 29/06 | (2006.01) |

(52) U.S. Cl.
CPC ............ *G06F 21/554* (2013.01); *H04L 63/08* (2013.01); *H04L 63/1408* (2013.01); *G06F 2221/2133* (2013.01)

(56) References Cited

U.S. PATENT DOCUMENTS

| | | | | |
|---|---|---|---|---|
| 5,557,686 A * | 9/1996 | Brown | ............... | G07C 9/00142 340/5.51 |
| 6,938,061 B1 * | 8/2005 | Rumynin | ............... | G06F 7/5318 708/210 |
| 6,938,159 B1 * | 8/2005 | O'Connor | ............... | G06F 21/32 713/186 |
| 6,957,185 B1 * | 10/2005 | Labaton | ............... | G06Q 20/10 380/279 |
| 6,957,186 B1 * | 10/2005 | Guheen | ............... | G06Q 90/20 705/323 |
| 6,983,061 B2 * | 1/2006 | Ikegami | ............... | G06F 21/32 382/115 |
| 7,130,452 B2 * | 10/2006 | Bolle | ............... | G06F 21/6245 235/379 |
| 7,133,792 B2 * | 11/2006 | Murakami | ............... | G06K 9/00536 702/104 |
| 7,139,916 B2 * | 11/2006 | Billingsley | ............... | G06F 21/36 380/255 |
| 7,245,218 B2 * | 7/2007 | Ikehara | ............... | G06F 3/03543 340/5.53 |
| 7,494,061 B2 * | 2/2009 | Reinhold | ............... | H04L 63/0861 235/375 |
| 8,417,960 B2 * | 4/2013 | Takahashi | ............... | H04L 9/0866 340/5.82 |
| 8,510,113 B1 * | 8/2013 | Conkie | ............... | G10L 13/00 704/258 |
| 9,304,915 B2 * | 4/2016 | Adams | ............... | G06F 12/1063 |
| 2001/0004733 A1 * | 6/2001 | Eldering | ............... | G06Q 20/20 705/14.41 |
| 2003/0033526 A1 * | 2/2003 | French | ............... | G06F 21/31 713/168 |
| 2003/0074201 A1 * | 4/2003 | Grashey | ............... | G10L 17/22 704/273 |
| 2004/0015714 A1 * | 1/2004 | Abraham | ............... | G06F 17/30867 726/4 |
| 2004/0111523 A1 * | 6/2004 | Hall | ............... | H04L 29/06 709/230 |
| 2005/0008148 A1 * | 1/2005 | Jacobson | ............... | G06F 3/038 380/26 |
| 2005/0289264 A1 * | 12/2005 | Illowsky | ............... | G06F 13/00 710/104 |
| 2006/0143454 A1 * | 6/2006 | Walmsley | ............... | G06F 21/85 713/170 |
| 2006/0195328 A1 * | 8/2006 | Abraham | ............... | G06Q 20/204 235/382 |
| 2006/0224898 A1 * | 10/2006 | Ahmed | ............... | G06F 21/36 713/186 |
| 2007/0266305 A1 * | 11/2007 | Cong | ............... | G06Q 30/02 715/700 |
| 2007/0283416 A1 * | 12/2007 | Renaud | ............... | G06F 21/31 726/2 |
| 2009/0089879 A1 * | 4/2009 | Wang | ............... | G06F 21/53 726/24 |
| 2009/0254336 A1 * | 10/2009 | Dumais | ............... | G06F 9/4443 704/9 |
| 2010/0042403 A1 * | 2/2010 | Chandrasekar | ............... | G06Q 30/02 704/9 |
| 2010/0046806 A1 * | 2/2010 | Baughman | ............... | G06F 21/316 382/115 |
| 2010/0328074 A1 * | 12/2010 | Johnson | ............... | G06F 21/31 340/573.1 |
| 2011/0102570 A1 * | 5/2011 | Wilf | ............... | G06F 3/017 348/77 |
| 2011/0113388 A1 * | 5/2011 | Eisen | ............... | G06F 21/32 715/856 |
| 2011/0251823 A1 * | 10/2011 | Davis | ............... | G06Q 30/02 702/181 |
| 2011/0271342 A1 * | 11/2011 | Chung | ............... | G06F 21/554 726/23 |
| 2012/0005483 A1 * | 1/2012 | Patvarczki | ............... | G06F 21/36 713/182 |
| 2012/0154173 A1 * | 6/2012 | Chang | ............... | G01S 7/032 340/904 |
| 2012/0218193 A1 * | 8/2012 | Weber | ............... | G06F 1/1626 345/173 |
| 2012/0278804 A1 * | 11/2012 | Narayanasamy | ... | G06F 9/45558 718/1 |
| 2013/0036416 A1 * | 2/2013 | Raju | ............... | G06F 9/45558 718/1 |
| 2014/0078193 A1 * | 3/2014 | Barnhoefer | ............... | G09G 3/3406 345/690 |
| 2014/0082369 A1 * | 3/2014 | Waclawsky | ............... | G06F 21/62 713/189 |
| 2015/0012920 A1 * | 1/2015 | De Santis | ............... | G06F 9/45533 718/1 |

OTHER PUBLICATIONS

Zheng et al., "An Efficient User Verification System via Mouse Movements", Oct. 17-21, CCS' 11, Chicago, Illinois.*

Nakkabi et al., "improving Mouse Dynamics Biometric Performance Using Variance Reduction via Extractor with Separate Features", Nov. 2010, IEEE Transactions on System, Man, and Cybermetrics—Part A: Systems and Humans, vol. 40, No. 6.*

Yampolskiy et al., "Behavioural Biometrics: a survey and classification", 2008, International Journal of Biometrics, vol. 1, No. 1, pp. 81-113.*

Frantzeskou et al., "Identifying Authorship by Byte-Level N-Grams: The source Code Author Profile (SCAP) Method", Spring 2007, International Journal of Digital Evidence, vol. 6, Issue 1, pp. 1-18.*

Spafford et al., "Software Forensics: Can We Track Code to its Authors?", Feb. 1992, Computer Science Technical Report, Purdue e-Pubs, Report No. CSD-TR-92-010.*

Bailey, Kyle O., "Computer Based Behavioral Biometric Authentication Via Multi-Modal Fusion", Thesis, 2013, Air Force Insitute of Technology.*

(56) References Cited

OTHER PUBLICATIONS

T. Garfinkel and M. Rosenblum, "A virtual Machine Introspection-Based Architecture for Intrusion Detection.", 2003, Proc. Network and Distributed Systems Security Symp., The Internet Society, pp. 191-206.*

Franklin et al., Remote Detection of Virtual Machine Monitors with Fuzzy benchmarking, ACM SIGOPS Operating Systems Review, V42, Issue 3, Apr. 2008.*

Ferrie Peter, Attack on Virtual Machine Emulators, Symantec Technology Exchange, 2007.*

Liston et al., On the Cutting Edge: Thwarting Virtual Machine Detection, 2006.*

Nance et al., Virtual Machine Introspection, IEEE Security & Privacy, 2008.*

Cleef et al., Security Implications of Virtualization: A Literature Study, Science and Engineering, 2009.*

Ormandy, Tavis, An Empirical Study into the Security Exposure to Hosts of Hostile Virtualized Environments, 2007.*

* cited by examiner

METHOD, DEVICE, AND SYSTEM OF DIFFERENTIATING BETWEEN VIRTUAL MACHINE AND NON-VIRTUALIZED DEVICE

CROSS-REFERENCE TO RELATED APPLICATIONS

This application claims priority and benefit from U.S. provisional patent application No. 61/973,855, titled "Method, Device, and System of Detecting Identity of a User of an Electronic Service", filed on Apr. 2, 2014, which is hereby incorporated by reference in its entirety.

This application is a Continuation-in-Part (CIP) of, and claims priority and benefit from, U.S. patent application Ser. No. 14/566,723, filed on Dec. 11, 2014; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

This application is a Continuation-in-Part (CIP) of, and claims priority and benefit from, U.S. patent application Ser. No. 14/320,653, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/320,656, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,393, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,394, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,395, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,396, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,397, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,398, filed on Jul. 8, 2014; which claims priority and benefit from U.S. provisional patent application No. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

For example, the present invention may differentiate between: (i) a genuine user or legitimate user or authorized user, who directly utilizes a real-world computing device in order to access a service or a remote server; and (ii) an attacker or hacker or "fraudster" or unauthorized user who accesses the service or the remote server by utilizing a Virtual Machine (VM) which runs on top of (or within) a VM host or a VM monitor (VMM).

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1A:
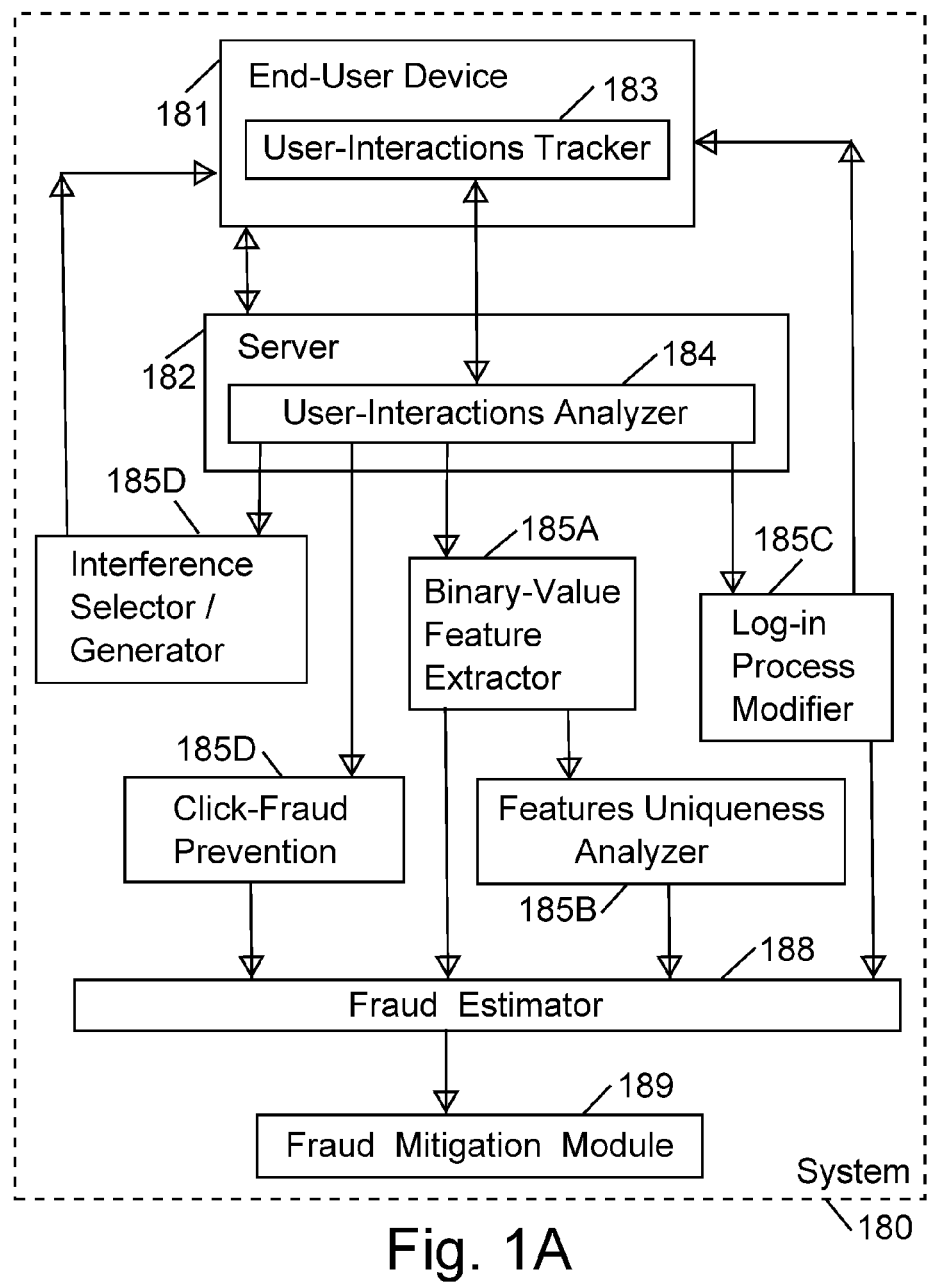
FIG. 1A is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that some hackers and fraudulent users may utilize a Virtual Machine (VM) running on top of a hypervisor or VM Monitor (VMM), in order to perform or to facilitate fraudulent activity. The VM, or multiple VMs, may be used by a hacker or attacker for attacking, or carrying out malicious activities on, a remote system or remote computer. Each VM may have a unique or different "fingerprint", and/or may mimic or imitate to some extent one or more characteristics of a the victim's computerized environment (e.g., Operating System type and/or version, browser, utilization of a stolen "cookie" file or "cookie" data-item, or the like); thereby allowing the hacker or attacker to avoid being detected or captured by security applications that are device-oriented or that are based on identification of Device-ID, by security applications which track devices or computers that had been known in the past to engage in hacking activities or attacks against the current system or other systems.

Applicants have further realized that a hacker may perform "cloning" or duplication of a computer (or computing environment) of a legitimate user, in order to imitate the legitimate user or in order to pretend being the legitimate user, thereby avoiding the requirement to perform an authentication process (e.g., after the legitimate user performs authentication towards the service provider, such as a banking website or electronic commerce website; and such that the cloned environment may already contain a cloned or copied authentication key or "cookie" that indicates to the server that the client is logged-in or authenticated). Additionally, a hacker may utilize VM technology in order to create, define and/or utilize a large number of VMs running on relatively small computers or servers, thereby obviating the need for the hacker to acquire and operate numerous physical devices by utilizing virtualization instead.

The present invention may detect activity performed by a VM, for example, based on identifying different feedback or reaction from a mouse or keyboard or other input unit; and/or by identifying differences between the VM and the computer on top of which the VM is running ("the hosting environment").

For demonstrative purposes, some portions of the discussion herein may relate to differentiation between: (A) a legitimate or authorized human user, and (B) an unauthorized user, or attacker, or cyber-attacker, who utilizes a VM in order to access a computerized service and/or while posing as if he is the legitimate authorized user. However, the present invention, and the modules and operations describe herein, may also be used, similarly, in order to differentiate between: (i) a human user that interacts with a computerized service directly, without a VM, without a VMM, without a virtualized environment, by using a non-virtualized platform; and (ii) another human user, who may be a cyber-attacker but may not necessarily be a cyber-attacker, who utilizes a VM and/or VMM and/or virtualized environment to access the computerized service, without necessarily cyber-attacking the computerized service (e.g., may be a human user that attempts to access the computerized service via a VM for testing purposes, or for grabbing data or copying data, or for learning or probing the features or the elements of the computerized service).

Reference is made to FIG. 1A, which is a schematic block-diagram illustration of a system 180 in accordance with some demonstrative embodiments of the present invention. System 180 may comprise, for example: an end-user device 181 able to communicate (directly or indirectly) with a server 182 of a computerized service. The interactions between end-user device 181 and server 182 may be monitored by an interactions monitoring module 183, may be stored in an interactions log 184, and may be analyzed by an interactions analyzer 185. The interactions analyzer 185 may be associated with, or may comprise, a legitimate user/VM differentiator 186, which may optionally comprise one or more of sub-systems 200, 300, 400 and/or 500 that are described herein; and/or may implement one or more other differentiating operations or methods that are described herein. The output of the legitimate user/VM differentiator 186 may be transferred to an optional fraud estimator 188, which may estimate an aggregated threat-level or fraud-score associated with the particular user or session or account; and which may accordingly trigger a fraud mitigation module 189 to perform one or more fraud mitigation operations.

System 180 may be implemented by using suitable hardware components and/or software modules, which may be co-located or may be distributed over multiple locations or multiple devices. Components and/or modules of system 180 may interact or communicate over one or more wireless communication links, wired communication links, cellular communication, client/server architecture, peer-to-peer architecture, or the like.

Figure 1B:
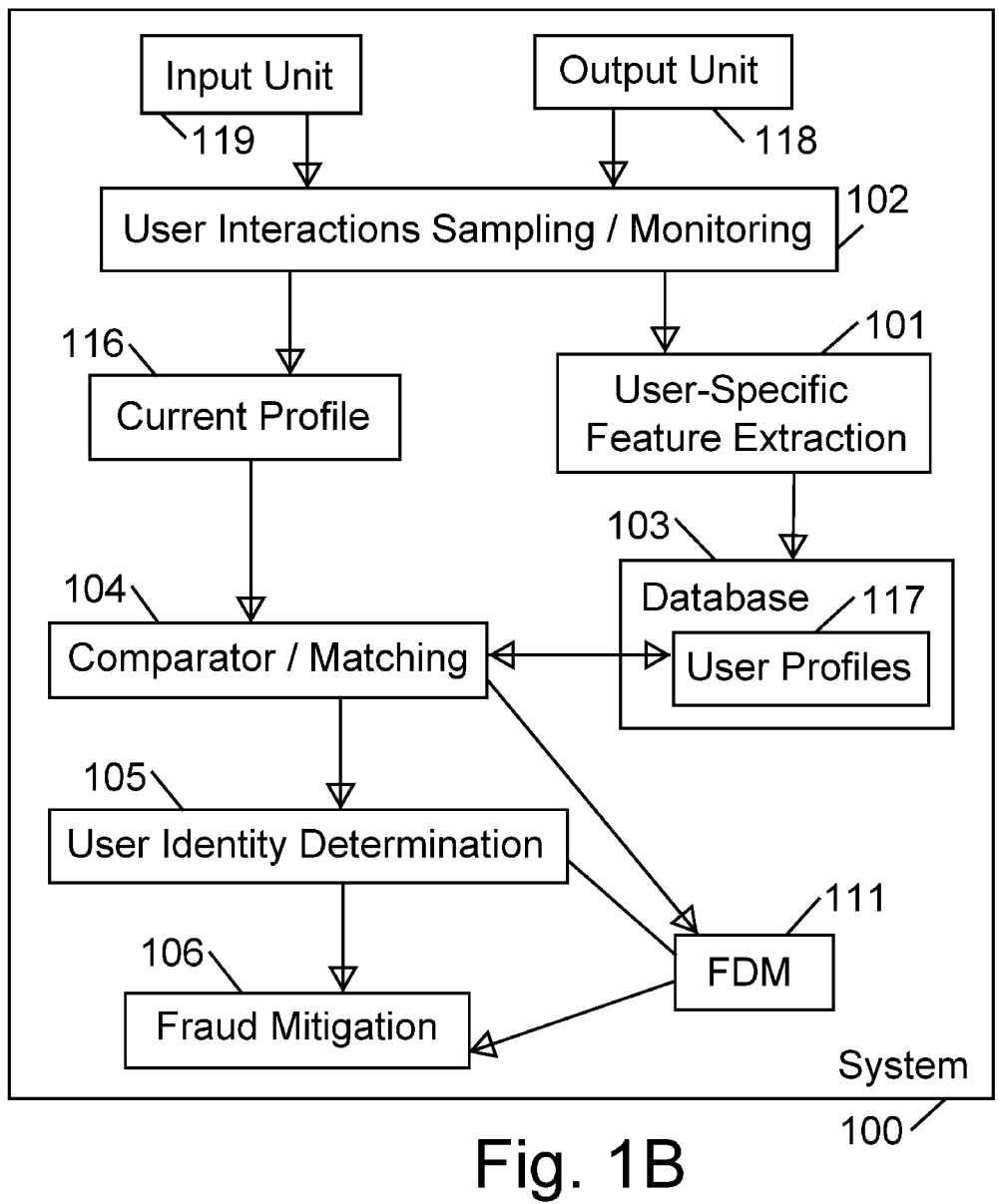
FIG. 1B is a schematic block-diagram illustration of another system, in accordance with some demonstrative embodiments of the present invention.

Reference is made to FIG. 1B, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via the input unit 119 and/or the output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor and track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the user types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, meta-data, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

Figure 2:
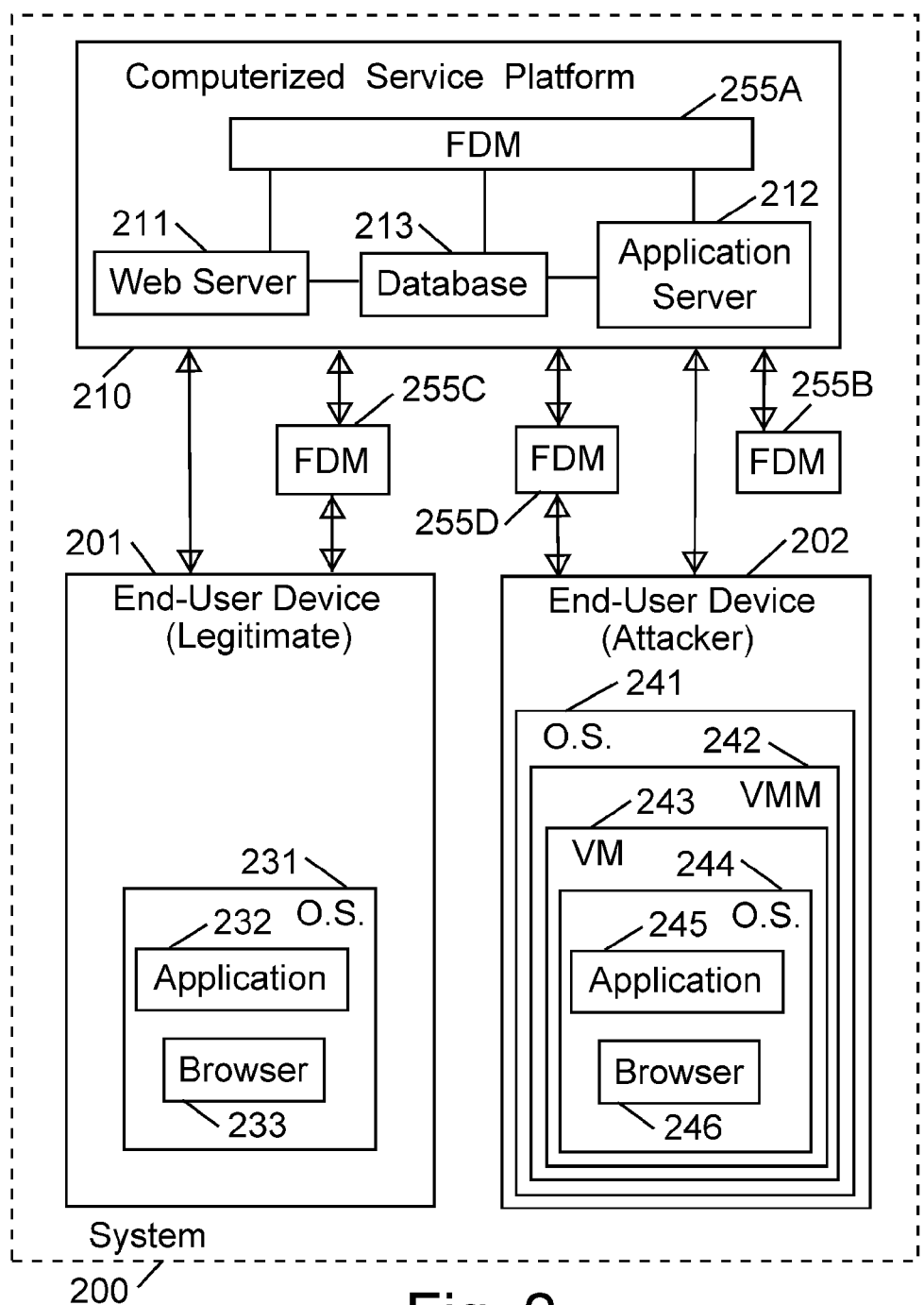
FIG. 2 is a schematic block-diagram illustration of another system, in accordance with some demonstrative embodiments of the present invention.

System 100 and/or system 180 may be implemented by using suitable hardware components and/or software modules, which may be co-located or may be distributed over multiple locations or multiple devices. Components and/or modules of system 100 and/or system 180 may interact or communicate over one or more wireless communication links, wired communication links, cellular communication, client/server architecture, peer-to-peer architecture, or the like Reference is made to FIG. 2, which is a schematic block-diagram illustration of a system 200 in accordance with some demonstrative embodiments of the present invention. System 200 may comprise a computerized service platform 210 able to communicate (e.g., via wireless communication links, via wired communication links, over the Internet, over TCP/IP or other protocols, over cellular network, or the like) with one or more end-user devices, for example, end-user device 201 (e.g., operated by a legitimate user or authorized user) and end-user device 202 (e.g., operated by an attacker or hacker or fraudulent user). In accordance with the present invention, a Fraud Detection Module (FDM), or multiple FDMs, may be utilized in order to detect fraud or possible fraud, and/or in order to differentiate between (a) end-user device 201 operated by a legitimate user, and (b) end-user device 202 operated by an attacker.

Computerized service platform 210 may comprise, for example, a Web server 211, an application server 212, and a database 213 which may provide a service to remote user(s) that operate remote device(s). Such service may be, for example, banking service, brokerage service, financial service, electronic commerce or e-commerce service, information service, entertainment service, or the like.

End-user device 201 may be operated by a legitimate user. End-user device 201 may utilize an Operating System (OS) 231, which may enable the user to utilize one or more installed software applications, for example, an application 232, a web browser 233, or the like. The OS 231 interacts with hardware components of end-user device 201, either directly or via OS driver(s), in a non-virtualized way.

In contrast, end-user device 202 may be operated by an attacker. For example, end-user device 202 may comprise a first OS 241 (e.g., Linux), on which a Virtual Machine Monitor (VMM) 242 or Virtual Machine (VM) Hosting Environment may be installed and may run. The VMM 242 may create and may control a Virtual Machine (VM) 243, for example, having a second OS 244 (e.g., Windows) and having one or more applications (e.g., an application 245, a web browser 246, or the like). The applications that run within the VM 243 do not interact directly with the hardware of end-user device 241; rather, the VMM 242 handles such interactions on their behalf.

One or more components of system 200 may comprise an FDM module. For example, in some implementations, computerized service platform 210 may comprise therein an FDM 255A; or may be associate with (or coupled to) an external FDM 255D. Additionally or alternatively, FDM(s) may monitor communications between end-user devices and the computerized service platform 210; for example, FDM 255C may monitor communications between end-user device 201 and computerized service platform 210; and similarly, FDM 255D may monitor communications between end-user device 202 and computerized service platform 210. In some implementations, the FDM may be implemented as part of end-user device, or as part of the OS or application or web-browser that runs on the end-user device. Each one of the FDM(s) 255A-255D (or other FDM which may be located elsewhere in system 200) may perform fraud detection, and/or may differentiate between legitimate user of end-user device 201 and fraudulent user of end-user device 202; and/or may differentiate between end-user device 201 which operates in a non-virtualized environment, and end-user device 202 which operates utilizing a VM or in a virtualized environment.

Figure 3:
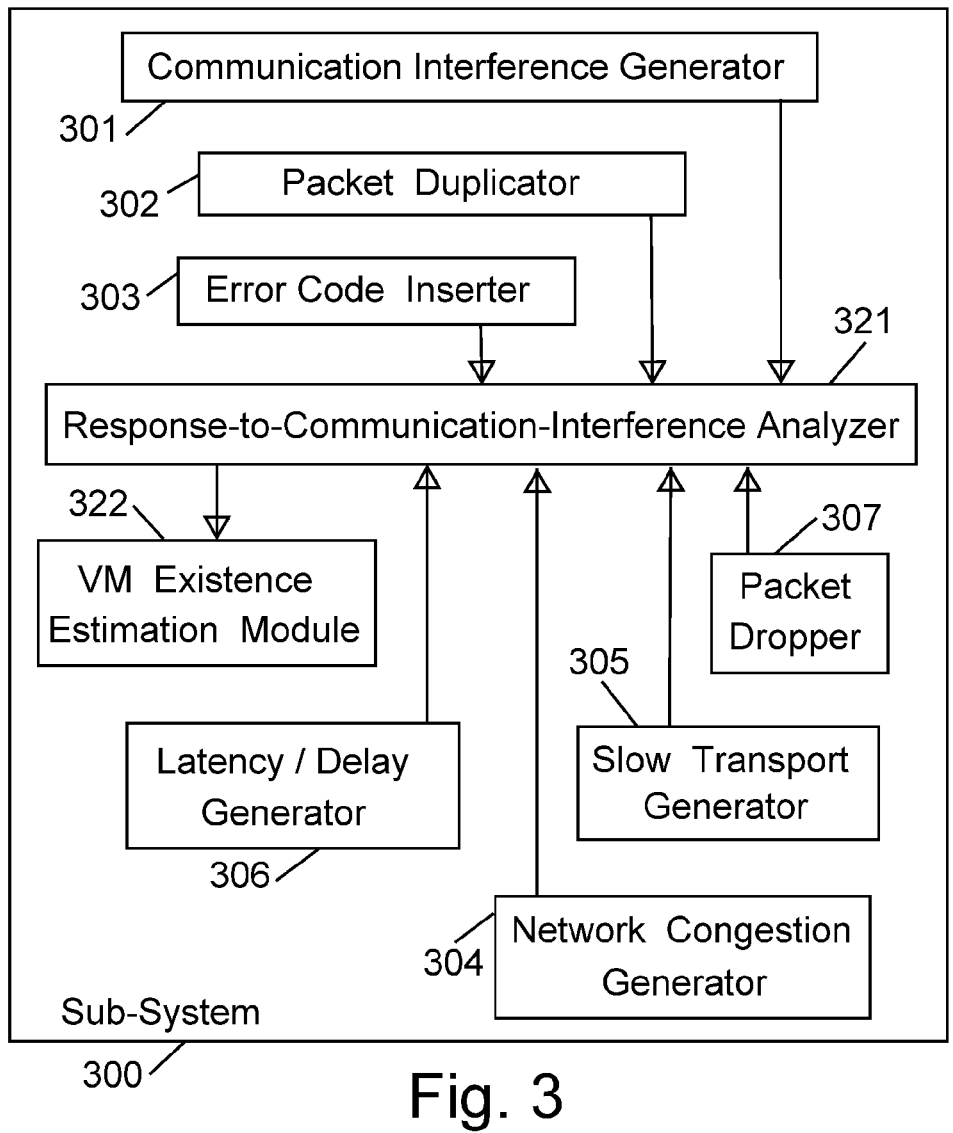
FIG. 3 is a schematic block-diagram illustration of a fraud detection sub-system, in accordance with some demonstrative embodiments of the present invention.

Reference is made to FIG. 3, which is a schematic block-diagram illustration of a fraud detection sub-system 300 in accordance with some demonstrative embodiments of the present invention. Sub-system 300 may operate to detect activity or fraudulent activity that is performed by an attacker via a Virtual Machine (VM), or by a set or batch or group of VMs. Sub-system 300 may be implemented as part of, or as a sub-module of, the FDM(s) of FIG. 2, the system 200 of FIG. 2, the fraud detection module 111 of FIG. 1B, the system 100 of FIG. 1B, the system 180 of FIG. 1A, the legitimate user/VM differentiator 186 of FIG. 1A, and/or other suitable systems or modules.

Fraud-detection sub-system 300 may comprise, for example: a communication interference generator 301; a packet duplicator 302; an error code inserter 303; a network congestion generator 304; a slow transport generator 305; a latency/delay generator 306; a packet dropper 307; a response-to-communication-interference analyzer 321; and a VM existence estimation module 322.

Fraud detection sub-system 300 may comprise one or more security applications or electronic services which may inject or may introduce, for example, small interferences in the communication between the service and the user's device. For example, a communication interference generator 301 may generate and/or inject and/or introduce small interferences in the communication between the service and the user's device. In some embodiments, a packet duplicator module 302 may intentionally perform duplication of sent packet(s), or may cause the sending of multiple identical packets, as a communication interference. In some embodiments, an error code inserter module 303 may cause intentional insertion of error codes into a communication session or communication message that is transmitted to (or responded to) a user device. A network congestion generator 304 may create one or more network conditions that mimic or reflect network congestion, at pre-defined time intervals, or at pseudo-random time intervals. Similarly, a slow transport generation module 305 may cause the online service to slow-down the transport of data to the user, mimicking a slow network condition, at pre-defined times or time-intervals, or at pseudo-random times or time-intervals. A latency/delay generator 306 may artificially inject latency or delay(s) into particular communications, or at pre-defined times or time-intervals, or at pseudo-random times or time-intervals. A packet dropper module 307 may intentionally drop a packet (or a set of consecutive packets, or a group of non-consecutive packets), or may mimic or imitate the accidental dropping or loss of such packet(s), from an ongoing communication session between a server and the user's computer.

Fraud detection sub-system 300 may additionally comprise a response to communication interference analyzer 321 and a VM existence estimation module 322. Response-to-communication-interference analyzer 321 may operate to track and monitor the response of the end-user device to the generated communication interference or abnormality and to analyze the response and its characteristics in order to determine whether or not the end-user device is a VM based on the fact that VM(s) respond in a different manner to such communication interferences, compared to the response of a human user that directly utilizes a physical computing device. For example, one or more of such injected communication interferences may force the hosting environment (which hosts a VM in it, or on it) to expose its existence, thereby indicating that a VM is running on top of the hosting environment. Other suitable modules may identify, for example, that the activity received from the user originates from a VM, rather than from a human user, as described herein.

Applicants have realized that in a usage session that involves virtualization, there is a greater amount or greater number of components that are involved in communication: the physical Network Interface Card (NIC) (or modem, or wireless modem, or other suitable adaptor or interface adapter); a driver supplied by the manufacturer of the physical NIC; a driver or application of the hypervisor (for example, "esx" from VMware); a virtual driver that the hypervisor provides to the VM; a driver of the VM itself (e.g., as Windows XP). The VM existence estimation module 322 may detect that one or more, or all, of these components are involved in the communication session, based on, for example, their handling of communication interferences, error codes, network congestion, slow transport, latency or delays, or the like.

In a demonstrative implementation, the system may measure the time it takes for the "user"—be it the legitimate human user, or a cyber-attacker operating a VM posing as the legitimate human user—to respond to various interferences or communication errors that may be intentionally introduced to the communication session; such as, non-responsiveness of the website or web-page or service that is being accessed, a response that includes errors or that appears to be erroneous, an "invalid" or improper response from the website or web-page or service being accessed, or the like. Analysis of the reaction (e.g., as detailed herein) may point to the possibility that the "user" is actually or more-probably a VM running within or on top a hosting environment or VMM, rather than a human user interacting directly with a computing device.

Some implementations may monitor and/or identify the response from the end-user device (a real-world computer operated directly by a human user, or a VM hosted on top of a hosting environment) to such intentionally-introduced interference; for example, whether re-send or re-submit operation were performed, whether the communication session (or website, or web-page) was abandoned or dropped, whether one or more parameters or characteristics of the communication session was changed in response to the interference (e.g., resizing or maximizing of the window size), or the like.

In some implementations, for example, the system may intentionally drop or disregard an incoming packet, and may inspect whether or not the packet is re-sent, what is the period of time that elapses until such re-sending, and/or detect traffic incoming from a bot-net; optionally using such methods in order to detect an Application Denial-of-Service (DOS) attack.

Figure 4:
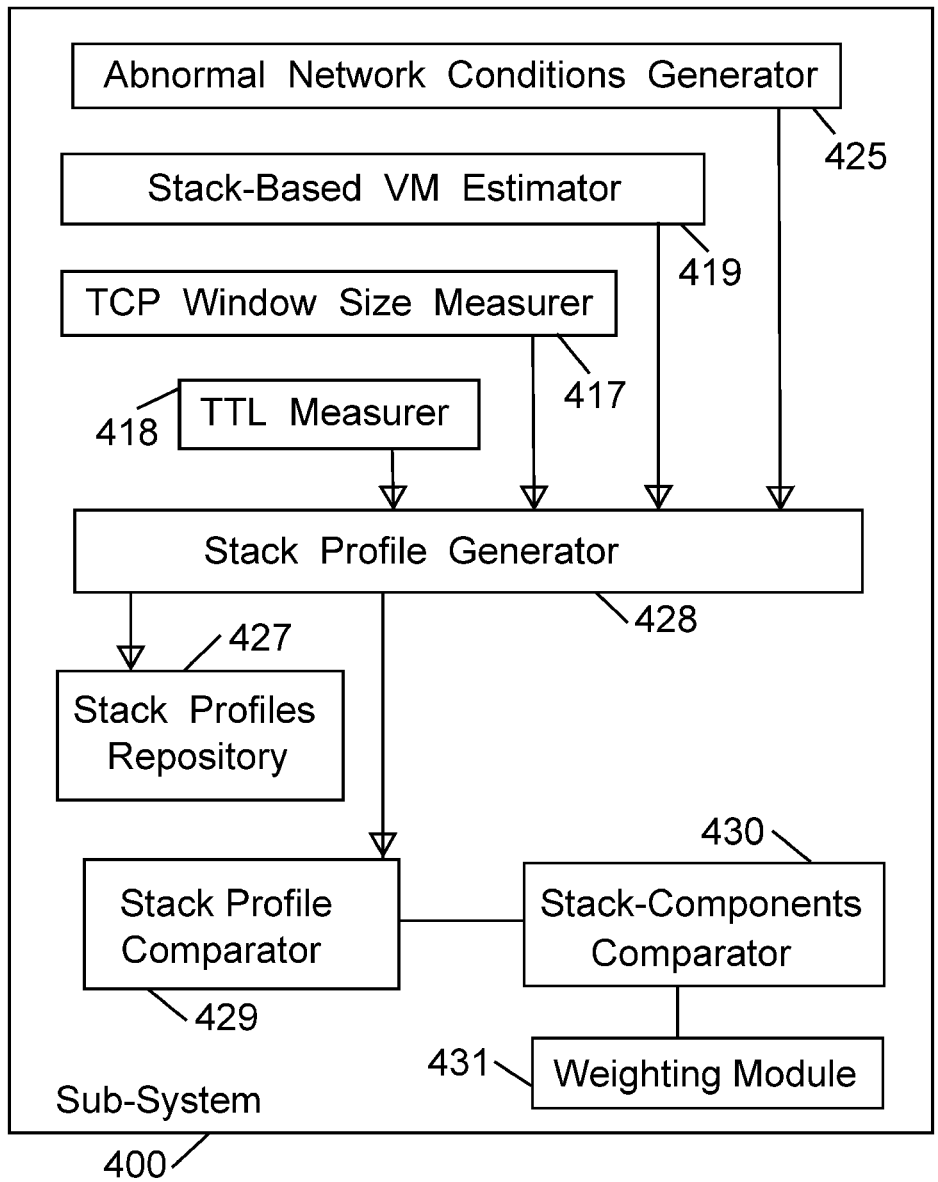
FIG. 4 is a schematic block-diagram illustration of another fraud detection sub-system, in accordance with some demonstrative embodiments of the present invention.

Reference is made to FIG. 4, which is a schematic block-diagram illustration of a fraud detection sub-system 400 in accordance with some demonstrative embodiments of the present invention. Sub-system 400 may operate to detect activity or fraudulent activity that is performed by an attacker via a Virtual Machine (VM), or by a set or batch or group of VMs. Sub-system 400 may be implemented as part of, or as a sub-module of, the FDM(s) of FIG. 2, the system 200 of FIG. 2, the fraud detection module 111 of FIG. 1B, the system 100 of FIG. 1B, the system 180 of FIG. 1A, the legitimate user/VM differentiator 186 of FIG. 1A, and/or other suitable systems or modules.

Fraud-detection sub-system 400 may comprise, for example: a stack-based VM estimator 419; a TTL measurer 418; a TCP window-size measurer 417; an abnormal network conditions generator 425; a stack profile generator 428; a stack profiles repository 427; a stack profile comparator 429; a stack-components comparator 430; and a weighting module 431.

As demonstrated in FIG. 4, some embodiments may utilize a Stack-based VM estimator 419 to detect and/or identify differences among VM versus non-VM implementations; which may take into account that a stack of one operating system (e.g., Microsoft Windows) is different from the stack of another operating system (e.g., Linux), and that stacks of different versions of an OS (such as Windows XP versus Windows 8) are different from each other. This may affect other measurable characteristics, such as, for example, Time-To-Live (TTL) of packets which may be measured or tracked by a TTL measurer 418 (e.g., by inspecting "Expires" header or "Expires" field in packets or HTTP headers or HTTP packets, or in a "cookie"; or using other TTL measurement techniques). Accordingly, each implementation may depend on the OS type, on the version of the OS or some of its components (e.g., kernel version), on the patching level of the OS, and on other (e.g., default) configuration parameters of that OS; for example, the TCP window size in Linux of a particular version may be X, whereas the TCP window size in Linux of another version (or, of Microsoft Windows 7) may be Y, and these parameters may be tracked or measured by a TCP window size measurer 417; thereby assisting the Stack-based VM estimator 419 to detect VM or non-VM users.

In accordance with the present invention, a computing system may be assembled and configured; for example, to comprise various configurations and various setups of various VMs, having different hypervisors, different OS types and/or OS versions, different NICs or network cards, or the like. The system may further comprise an abnormal network conditions generator 425 able to generate interference or abnormality or error in particular communication network conditions or characteristics (e.g., delays, error codes, network congestion). The system may additionally comprise real-life non-virtualized computing platforms, to be used for comparison purposes against the various VMs. The abnormal network conditions generator 425 may generate abnormal network conditions or communication interferences based on a "fuzzy logic" algorithm; and/or based on specific pre-defined interference scenarios, for example, by using advanced settings of TCP or irregular settings for establishing TCP connection, introducing packet loss, irregular packets, invalid packets, erroneous packets, dropped packets, duplicate packets, or the like.

Optionally, a stack profiles repository 427 may be used to store multiple profiles or multiple "signatures" of various computing stacks (e.g., a set of computing elements that consists of an operating system, kernel version, drivers, hardware components that are used, TCP parameters, browser version, or the like). A stack profile generator 428 may be used to generate profiles or signatures to a variety of computing platforms, including real-life computing platforms as well as various VMs that are hosted on various hosting environments or VMMs; and such stack profiles may be stored in the stack profiles repository 427; each profile or signature may include a unique arrangement or aggregation of indicators corresponding to the above-mentioned computing elements (e.g., represented as a long string or bit-stream, indicating operating system, kernel version, browser version, or the like). Subsequently, when an end-user device connects or attempts to connect to a service, the stack profile generator 427 may generate an ad-hoc stack profile for that end-user device, and a stack profile comparator 429 may compare the current ad-hock stack profile to previously-stored stack profiles in the stack profile repository 427. The comparison may yield a match between the current ad-hoc computing stack profile, and a pre-stored computing stack profile of a real-world computing platform that is known to be authentic and non-VM, thereby indicating that a VM is most probably not involved in the current communication session. Alternatively, the comparison may yield a match between the current ad-hoc computing stack profile, and a pre-stored computing stack profile that is associated with a VM or with a hosted environment or VMM, thereby indicating that a VM is most probably involved in the current communication session.

The system may check each interference scenario, against each VM and against each non-virtualized platform; and may detect differences with regard to functional parameters, performance time, delays, the content that is actually transported (payload, metadata, control data), the particular timing of transport of data items, and other parameters, in order to detect differences between VM and non-VM users. For example, a stack-components comparator 430 may compare the value of each tracked parameter or component, with pre-stored values of real-world (non-virtualized) components and virtualized components; and a weighting module 431 may generate a weighted score indicating whether the entirety of the computing stack, based on the weighted aggregation of its discrete components, tends to be closer to matching a virtualized platform (a VM) or a non-virtualized platform (a real-world hardware computer). The weights may be pre-defined or pre-allocated (e.g., using a lookup table or other weights list), or the weights may be implemented as weight-parameters in a weighted fraud-score (or risk level, or threat level) formula which may be calculated.

Based on the insights of the comprehensive system, such communication interference module(s) may be integrated as part of the actual service or website or web-service or online service; and may generate the particular interference(s) that would allow the system to detect that a "user" interacting with the service is actually a VM and not a direct human user (namely, a human user that utilizes a non-virtualized platform).

Figure 5:
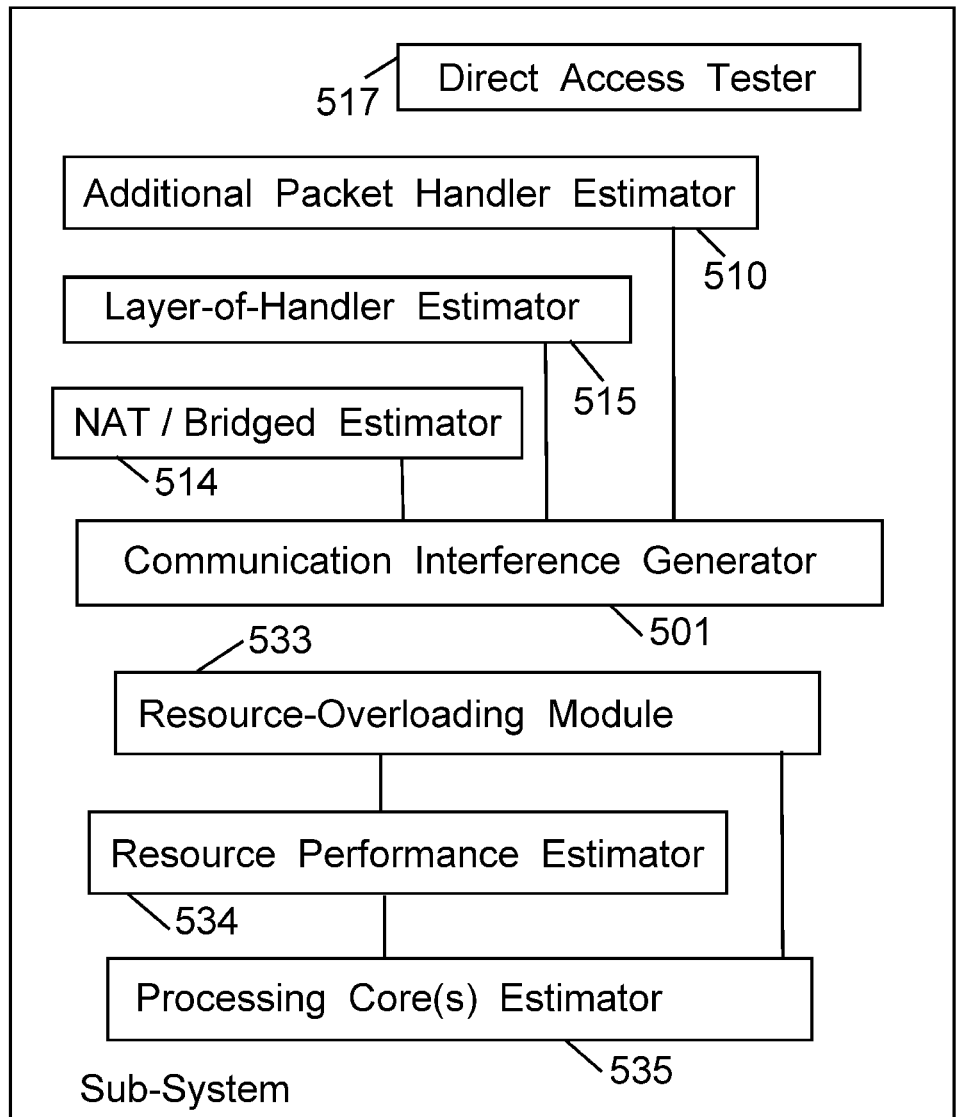
FIG. 5 is a schematic block-diagram illustration of still another fraud detection sub-system, in accordance with some demonstrative embodiments of the present invention.

Reference is made to FIG. 5, which is a schematic block-diagram illustration of a fraud detection sub-system 500 in accordance with some demonstrative embodiments of the present invention. Sub-system 500 may operate to detect activity or fraudulent activity that is performed by an attacker via a Virtual Machine (VM), or by a set or batch or group of VMs. Sub-system 500 may be implemented as part of, or as a sub-module of, the FDM(s) of FIG. 2, the system 200 of FIG. 2, the fraud detection module 111 of FIG. 1B, the system 100 of FIG. 1B, the system 180 of FIG. 1A, the legitimate user/VM differentiator 186 of FIG. 1A, and/or other suitable systems or modules.

Fraud-detection sub-system 500 may comprise, for example: a resource-overloading module 533; a resource performance estimator 534; a processing core(s) estimator 535; a communication interference generator 501; an additional packet handler estimator 510; a layer-of-handler estimator 515; a NAT/Bridged estimator 514; and a direct access tester 517.

As demonstrated in FIG. 5, the present invention may identify that the user of a service is actually utilizing a VM, by estimating and/or determining the number of processing cores and/or CPU cores and/or processing resources that are associated with the user. Applicants have realized that some hackers often create VMs that are relatively weak in terms of processing power or processing resources, and that are allocated only some and not all of the processing resources of the hosting environment; and/or that many VMs are defined or created by using a "default" setting of a single-core machine (e.g., even if the hosting computer is a dual-core or multiple-core machine). The system may utilize a resource-overloading module 533 in order to intentionally run CPU-intensive or processing-intensive parallel computations or calculations, and may utilize a resource performance estimator 534 to measure or estimate the CPU strength and/or the processor core count that are associated with the user-side device; which in turn may be indicative of whether or not the end-user device is a (typically-weaker) virtualized environment (e.g., based on the time or processing-cycles or memory, which are actually used in order to complete a processing task or other resource-examining task). Optionally, the number of processing core(s) of the end-user device may be estimated or determined by a processing core(s) estimator 535, based on the performance of the end-user device in response to processing-intensive tasks that may be generated by the resource-overloading module 533. In some implementations, an estimate that the user-side machine has extensive processing resources and/or utilizes more than one processing core (e.g., may contribute to (or may base) a determination that the user is not a VM. In some implementations, an estimate that the user-side machine has low processing resources and/or utilizes a single processing core, may contribute to (or may base) a determination that the user is actually a VM and not a human user. Other characteristics may be measured or estimated, by using JavaScript or other methods, and other indicators may be used for identifying a VM and/or for supporting a possible decision that the user is actually a VM.

Applicants have realized that some attackers or hackers may utilize a VM in order to imitate or mimic or emulate another computer or another computing platform; for example, in order to create an impression towards a server computer of a service, as if the attacker's computer (which is a VM) is identical to or similar to the real-world computer (or computing device) of the victim (the real user, whose identity the attacker is imitating; or whose user account the attacker is trying to fraudulently access); and/or in order to create an impression towards a server computer of a service, as if the attacker's computer (which is a VM) is different from the real-world computer that the attacker utilizes. Accordingly, an attacker that wishes to pose as a victim user, or that wishes to pose as a different (non-attacker) user, may utilize a VM that may mimic or imitate characteristic of a victim computer or of a non-attacker computer. The present invention may utilize one or more methods or modules, in order to expose the fact that there is inconsistency, or incompatibility or mismatch, between (a) the characteristics of the computer that appears to be accessing the server, and (b) the characteristics of the computer that is actually accessing the server as they are inferred or deduced from the behavior of such computer in response to injected real-time communication errors or interferences.

The present invention may thus determine, identify and/or estimate, that there is an additional or alternate "handler" which handles or manipulates the communication packet; instead of or in addition to the expected, single "handler" of communication packets. Based on the responses to one or more injected communication interferences, an Additional Packet Handler estimator 510 may estimate or determine the existence of such additional packet handler, which may be or may include, for example, the physical NIC or network card of the computer hardware that hosts (or monitors) the VM; and/or the driver of the hypervisor, or the Operating System that hosts the VM; or the like. For example, the Additional Packet Handler Estimator 510 may estimate or may determine that the characteristics of the virtual NIC or the virtual network card (of the VM), or the virtual OS (of the VM), are characteristics that are typically associated with a VM and not with a real-world computing platform that runs directly on hardware (without a VMM); thereby estimating that probably a VM is being used to access the service or the server.

In some implementations, any packet that reaches the VM, is handled by one additional handler or by two (or more) additional handlers, namely, additional component(s) that are not present in the communication flow when a real-world computer is utilized (without a VM); and such packet(s) are handled by particular software modules that are part of the VM software (e.g., a virtualized network card, a virtualized driver of a virtualized OS).

Applicants have realized that in some implementations, the VMM or hypervisor is often defined by utilizing Network Address Translation (NAT), as a network element in Layer 2, rather than by utilizing bridged networking. Accordingly, a NAT/Bridged Estimator 514 may estimate that a client device is utilizing NAT networking, rather than bridged networking; and may utilize this to determine or estimate that the client device is actually a VM running on top of a VMM, rather than a real-world computer that directly runs on hardware.

In some implementations a Layer of Handler estimator 515 may analyze the communications data and/or meta-data in order to estimate, at which layer of the communication session are packets being handled by the user's device, or at which layer of the communication session are communication errors being handled by the user's device. For example, a communication interference generator 501 may inject or generate or introduce communication interferences or abnormalities; and the Layer of Handler estimator 515 may identify or may estimate that lower-layer elements or modules are handling such interferences or errors, thereby indicating that a VMM is handling such interferences or errors (and not transferring such errors or interferences to handling by the VM itself).

Applicants have realized that typically, a VM may not be capable of directly accessing a graphics card (or other graphic-processing hardware element) of the host computer on which the VM is hosted; whereas a non-VM environment may typically be capable of directly accessing the graphics card (or other graphic-processing hardware element). Accordingly, a Direct Access Tester 517 may attempt to directly access the graphics card of the end-user device, by utilizing one or more suitable algorithms or functions (e.g., by using or invoking WebGLWorker or other suitable functions), and may examine the success or failure of such attempt for direct access in order to deduce the possible existence of a VM.

In a demonstrative embodiment, for example, the Direct Access Tester 217 may utilize WebGLWorker (or other suitable function) in order to attempt to draw on the screen (e.g., on the actual screen of the end-user device, or on an invisible screen or a software-side screen that is not visible by the user) a pre-defined or randomly-selected visual item that typically requires direct access to the graphics card (e.g., a three-dimensional rotating cube or cuboid or box). If the attempt is successful, namely, the particular graphic element is successfully drawn, then the Direct Access Tester 517 may determine that the end-user device is not a VM (or, is most-probably not a VM); whereas, if the attempt fails, namely, the particular graphic element fails to be drawn, then the Direct Access Tester 517 may determine that the end-user device is actually a VM running on top of a VMM.

In accordance with some embodiments of the present invention, a method may comprise: determining whether a user, who utilizes a computing device to interact with a computerized service, (A) is a user interacting with a non-virtualized computing device, or (B) is a Virtual Machine (VM) running on top of a Virtual Machine Monitor (VMM); wherein the determining comprises: generating and introducing an interference into a communication session between the computerized service and the computing device; monitoring response of the computing device to said interference; based on the monitored response, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises duplicating a packet in said communication session between the computerized service and the computing device; wherein the determining comprises: based on the response of the computing device to said interference of a duplicated packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises intentionally dropping a packet in said communication session between the computerized service and the computing device; wherein the determining comprises: based on the response of the computing device to said interference of a dropped packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises inserting an error code into said communication session between the computerized service and the computing device; wherein the determining comprises: based on the response of the computing device to said interference of error code insertion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating network congestion in said communication session between the computerized service and the computing device; wherein the determining comprises: based on the response of the computing device to said interference of network congestion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises slowing-down network transport in said communication session between the computerized service and the computing device; wherein the determining comprises: based on the response of the computing device to said interference of slowed-down network transport, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating latency in said communication session between the computerized service and the computing device; wherein the determining comprises: based on the response of the computing device to said interference of latency, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating a communication error that causes a Virtual Machine Monitor (VMM) to handle the communication error without passing the communication error for handling by an underlying Virtual Machine (VM); based on the handling of said communication error, determining that the computing device is a Virtual Machine (VM) running on a Virtual Machine Monitor (VMM).

In some embodiments, the method may comprise: generating a communication error that causes a packet to be handled by both (i) a virtualized network card of a Virtual Machine (VM), and (ii) a hardware network card of a computer on which said Virtual Machine (VM) is running; detecting dual-handling of said packet due to said communication error; based on said dual-handling, determining that said computing device is a Virtual Machine (VM).

In some embodiments, the method may comprise: generating a communication error that causes a packet to be handled by both (i) a virtualized driver of a Virtual Machine (VM), and (ii) a non-virtualized driver of a computer on which said Virtual Machine (VM) is running; detecting dual-handling of said packet due to said communication error; based on said dual-handling, determining that said computing device is a Virtual Machine (VM).

In some embodiments, the method may comprise: determining whether said computing device is defined by utilizing Network Address Translation (NAT) or by utilizing bridged networking; based on a determination that said computing device is defined by utilizing Network Address Translation (NAT), determining that said computing device is a Virtual Machine (VM).

In some embodiments, the method may comprise: generating a communication error that is typically handled by an end-user device at a communication layer that is higher than data link layer (L2); monitoring the handling of said communication error by said computing device; detecting that said communication error was handled at the data link layer (L2); based on said detecting, determining that said computing device is a Virtual Machine (VM).

In some embodiments, the method may comprise: measuring a time-to-live (TTL) value of packets transported from said computerized service to said computing device; based on said TTL value, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method may comprise: measuring a Transmission Control Protocol (TCP) window size of said computing device; based on said TCP window size of said computing device, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method may comprise: storing in a repository profiles of multiple computing stacks of Virtual Machines (VMs); during the communication session between said computerized service and said computing device, generating an ad-hoc computing stack profile of said computing device; if the ad-hoc computing stack profile of said computing device matches a previously-stored profile of computing stack of Virtual Machine (VM), then determining that said computing device is a Virtual Machine (VM).

In some embodiments, the method may comprise: storing in a repository profiles of multiple computing stacks of non-virtualized computing platforms; during the communication session between said computerized service and said computing device, generating an ad-hoc computing stack profile of said computing device; if the ad-hoc computing stack profile of said computing device matches a previously-stored profile of a computing stack of non-virtualized computing platform, then determining that said computing device is a non-virtualized computing platform.

In some embodiments, the method may comprise: estimating two or more parameters of a computing stack of said computing device; generating a weighted score based on said two or more parameters of the computing stack of said computing device; if the weighted score matches a previously-calculated score that typically characterizes a Virtual Machine (VM), then determining that said computing device is a Virtual Machine (VM).

In some embodiments, the method may comprise: causing said computing device to perform a processing-intensive process, and monitoring progress of said processing-intensive process; based on monitored progress of said processing-intensive process, estimating whether said computing device is a single-core computing device or a multiple-core computing device; if it is estimated that said computing device is a single-core computing device, then determining that said computing device is a Virtual Machine (VM).

In some embodiments, the method may comprise: causing said computing device to perform a resource-overloading process, and monitoring progress of said resource-overloading process; based on monitored progress of said processing-intensive process, estimating whether said computing device is a high-resource computing device or a low-resource computing device; if it is estimated that said computing device is a low-resource computing device, then determining that said computing device is a Virtual Machine (VM).

In some embodiments, the method may comprise: causing said computing device to invoke a process that attempts to directly access a graphics card of said computing device; monitoring whether or not said process successfully accessed directly the graphics card of said computing device; if it is detected that said process did not successfully access directly the graphics card of said computing device, then determining that said computing device is a Virtual Machine (VM).

In some embodiments, the method may comprise: causing said computing device to invoke a process that attempts to draw a particular on-screen graphic item that can be drawn only by direct access to a graphics card of said computing device; monitoring whether or not said process successfully drew said graphic item; if it is detected that said process did not successfully draw said graphic item, then determining that said computing device is a Virtual Machine (VM).

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   determining whether a user, who utilizes a computing device to interact with a computerized service, (A) is a user interacting with a non-virtualized computing device, or (B) is a Virtual Machine (VM) running on top of a Virtual Machine Monitor (VMM);
   wherein the determining comprises:
   generating and introducing an interference into a communication session between the computerized service and the computing device;
   monitoring response of the computing device to said interference;
   based on the monitored response, determining whether said user, who utilizes the computing device to interact with a computerized service, (A) is a user interacting with a non-virtualized computing device, or (B) is a Virtual Machine (VM) running on top of a Virtual Machine Monitor (VMM).

2. The method of claim 1, wherein generating the interference comprises duplicating a packet in said communication session between the computerized service and the computing device; wherein the determining comprises:
   based on the response of the computing device to said interference of a duplicated packet, determining whether said user, who utilizes the computing device to interact with a computerized service, (A) is a user interacting with a non-virtualized computing device, or (B) is a Virtual Machine (VM) running on top of a Virtual Machine Monitor (VMM).

3. The method of claim 1, wherein generating the interference comprises intentionally dropping a packet in said communication session between the computerized service and the computing device; wherein the determining comprises:
   based on the response of the computing device to said interference of a dropped packet, determining whether said user, who utilizes the computing device to interact with a computerized service, (A) is a user interacting with a non-virtualized computing device, or (B) is a Virtual Machine (VM) running on top of a Virtual Machine Monitor (VMM).

4. The method of claim 1, wherein generating the interference comprises inserting an error code into said communication session between the computerized service and the computing device;
   wherein the determining comprises: based on the response of the computing device to said interference of error code insertion, determining whether said user, who utilizes the computing device to interact with a computerized service, (A) is a user interacting with a non-virtualized computing device, or (B) is a Virtual Machine (VM) running on top of a Virtual Machine Monitor (VMM).

5. The method of claim 1, wherein generating the interference comprises generating network congestion in said communication session between the computerized service and the computing device;
   wherein the determining comprises: based on the response of the computing device to said interference of network congestion, determining whether said user, who utilizes the computing device to interact with a computerized service, (A) is a user interacting with a non-virtualized computing device, or (B) is a Virtual Machine (VM) running on top of a Virtual Machine Monitor (VMM).

6. The method of claim 1, wherein generating the interference comprises slowing-down network transport in said communication session between the computerized service and the computing device;
   wherein the determining comprises: based on the response of the computing device to said interference of sloweddown network transport, determining whether said user, who utilizes the computing device to interact with a computerized service, (A) is a user interacting with a non-virtualized computing device, or (B) is a Virtual Machine (VM) running on top of a Virtual Machine Monitor (VMM).

7. The method of claim 1, wherein generating the interference comprises generating latency in said communication session between the computerized service and the computing device;
   wherein the determining comprises: based on the response of the computing device to said interference of latency, determining whether said user, who utilizes the computing device to interact with a computerized service, (A) is a user interacting with a non-virtualized computing device, or (B) is a Virtual Machine (VM) running on top of a Virtual Machine Monitor (VMM).

8. The method of claim 1, wherein generating the interference comprises generating a communication error that causes a Virtual Machine Monitor (VMM) to handle the communication error without passing the communication error for handling by an underlying Virtual Machine (VM);
   based on the handling of said communication error, determining that the computing device is a Virtual Machine (VM) running on a Virtual Machine Monitor (VMM).

9. The method of claim 1, comprising:
   generating a communication error that causes a packet to be handled by both (i) a virtualized network card of a Virtual Machine (VM), and (ii) a hardware network card of a computer on which said Virtual Machine (VM) is running;
   detecting dual-handling of said packet due to said communication error;
   based on said dual-handling, determining that said computing device is a Virtual Machine (VM).

10. The method of claim 1, comprising:
    generating a communication error that causes a packet to be handled by both (i) a virtualized driver of a Virtual Machine (VM), and (ii) a non-virtualized driver of a computer on which said Virtual Machine (VM) is running;

detecting dual-handling of said packet due to said communication error;

based on said dual-handling, determining that said computing device is a Virtual Machine (VM).

11. The method of claim 1, comprising:

determining whether said computing device is defined by utilizing Network Address Translation (NAT) or by utilizing bridged networking;

based on a determination that said computing device is defined by utilizing Network Address Translation (NAT), determining that said computing device is a Virtual Machine (VM).

12. The method of claim 1, comprising:

generating a communication error that is typically handled by an end-user device at a communication layer that is higher than data link layer (L2);

monitoring the handling of said communication error by said computing device;

detecting that said communication error was handled at the data link layer (L2);

based on said detecting, determining that said computing device is a Virtual Machine (VM).

13. The method of claim 1, comprising:

measuring a time-to-live (TTL) value of packets transported from said computerized service to said computing device;

based on said TTL value, determining whether said user, who utilizes the computing device to interact with a computerized service, (A) is a user interacting with a non-virtualized computing device, or (B) is a Virtual Machine (VM) running on top of a Virtual Machine Monitor (VMM).

14. The method of claim 1, comprising:

measuring a Transmission Control Protocol (TCP) window size of said computing device;

based on said TCP window size of said computing device, determining whether said user, who utilizes the computing device to interact with a computerized service, (A) is a user interacting with a non-virtualized computing device, or (B) is a Virtual Machine (VM) running on top of a Virtual Machine Monitor (VMM).

15. The method of claim 1, comprising:

storing in a repository profiles of multiple computing stacks of Virtual Machines (VMs);

during the communication session between said computerized service and said computing device, generating an ad-hoc computing stack profile of said computing device;

if the ad-hoc computing stack profile of said computing device matches a previously-stored profile of computing stack of Virtual Machine (VM), then determining that said computing device is a Virtual Machine (VM).

16. The method of claim 1, comprising:

storing in a repository profiles of multiple computing stacks of non-virtualized computing platforms;

during the communication session between said computerized service and said computing device, generating an ad-hoc computing stack profile of said computing device;

if the ad-hoc computing stack profile of said computing device matches a previously-stored profile of a computing stack of non-virtualized computing platform, then determining that said computing device is a non-virtualized computing platform.

17. The method of claim 1, comprising:

estimating two or more parameters of a computing stack of said computing device;

generating a weighted score based on said two or more parameters of the computing stack of said computing device;

if the weighted score matches a previously-calculated score that typically characterizes a Virtual Machine (VM), then determining that said computing device is a Virtual Machine (VM).

18. The method of claim 1, comprising:

causing said computing device to perform a processing-intensive process, and monitoring progress of said processing-intensive process;

based on monitored progress of said processing-intensive process, estimating whether said computing device is a single-core computing device or a multiple-core computing device;

if it is estimated that said computing device is a single-core computing device, then determining that said computing device is a Virtual Machine (VM).

19. The method of claim 1, comprising:

causing said computing device to perform a resource-overloading process, and monitoring progress of said resource-overloading process;

based on monitored progress of said processing-intensive process, estimating whether said computing device is a high-resource computing device or a low-resource computing device;

if it is estimated that said computing device is a low-resource computing device, then determining that said computing device is a Virtual Machine (VM).

20. The method of claim 1, comprising:

causing said computing device to invoke a process that attempts to directly access a graphics card of said computing device;

monitoring whether or not said process successfully accessed directly the graphics card of said computing device;

if it is detected that said process did not successfully access directly the graphics card of said computing device, then determining that said computing device is a Virtual Machine (VM).

21. The method of claim 1, comprising:

causing said computing device to invoke a process that attempts to draw a particular on-screen graphic item that can be drawn only by direct access to a graphics card of said computing device;

monitoring whether or not said process successfully drew said graphic item;

if it is detected that said process did not successfully draw said graphic item, then determining that said computing device is a Virtual Machine (VM).

* * * * *